(12) United States Patent
Trautman et al.

(10) Patent No.: US 8,680,939 B2
(45) Date of Patent: Mar. 25, 2014

(54) DIFFERENTIAL EQUALIZER AND SYSTEM, METHOD, AND COMPUTER PROGRAM PRODUCT THEREOF

(75) Inventors: Robert Trautman, Owego, NY (US); Boris Yost, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 86 days.

(21) Appl. No.: 13/277,359

(22) Filed: Oct. 20, 2011

(65) Prior Publication Data

US 2013/0099879 A1    Apr. 25, 2013

(51) Int. Cl.
*H04B 3/04* (2006.01)

(52) U.S. Cl.
USPC ........................................ 333/28 R

(58) Field of Classification Search
USPC ................................. 333/28 R, 18
See application file for complete search history.

(56) References Cited

U.S. PATENT DOCUMENTS

| | | | |
|---|---|---|---|
| 4,553,248 A | 11/1985 | Reed | |
| 5,570,037 A | 10/1996 | Llorens | |
| 6,169,764 B1 | 1/2001 | Babanezhad | |
| 6,590,400 B2 | 7/2003 | Hilliard et al. | |
| 6,593,770 B2 | 7/2003 | Hernandez-Marti | |
| 7,162,375 B2 | 1/2007 | Van Epps et al. | |
| 7,180,354 B2 | 2/2007 | Gabillard et al. | |
| 7,254,173 B1 | 8/2007 | Fu et al. | |
| 7,286,597 B2 | 10/2007 | Buchwald et al. | |
| 7,313,181 B2 | 12/2007 | Balamurugan et al. | |
| 7,372,335 B2 | 5/2008 | Komijani et al. | |
| 7,400,675 B2 | 7/2008 | Moughabghab et al. | |
| 7,408,425 B2 | 8/2008 | Zabinski et al. | |
| 7,440,525 B2 | 10/2008 | Moughabghab et al. | |
| 7,504,906 B2 * | 3/2009 | Chu | 333/28 R |
| 7,511,570 B2 | 3/2009 | Chamla et al. | |
| 7,671,694 B2 * | 3/2010 | Yeung et al. | 333/28 R |
| 7,697,601 B2 | 4/2010 | Mansuri et al. | |
| 7,848,122 B2 | 12/2010 | Tallam et al. | |
| 2008/0069191 A1 | 3/2008 | Dong et al. | |
| 2008/0123771 A1 | 5/2008 | Cranford et al. | |
| 2011/0169523 A1 | 7/2011 | Atrash et al. | |

* cited by examiner

*Primary Examiner* — Stephen Jones
(74) *Attorney, Agent, or Firm* — Miles & Stockbridge PC

(57) ABSTRACT

Differential equalizers and systems, methods, and computer products thereof configured and operative to dynamically compensate for signal losses over a wide frequency range by maintaining a relatively constant or consistent differential potential over the frequency range are disclosed. Received signals can be dynamically scaled down based on their frequency content such that all of the signals are outputted at or around a relatively constant amplitude.

19 Claims, 7 Drawing Sheets

DIFFERENTIAL EQUALIZER AND SYSTEM, METHOD, AND COMPUTER PROGRAM PRODUCT THEREOF

Embodiments relate generally to equalizers and systems, methods, and computer products thereof. In particular, embodiments include wideband differential equalizers and systems, methods, and computer products thereof.

SUMMARY

Disclosed embodiments include a method for compensating for signal loss in differential signals, comprising: receiving differential signals; dynamically compensating for signal loss in the received differential signals as the frequency content of the received differential signals varies, said dynamically compensating including scaling down the received differential signals to a same value within a certain tolerance; and outputting the scaled down differential signals. Optionally, the dynamically compensating can include dynamic adjustment of elements of an RLC circuit, the dynamic adjustment including adjustment of a ratio between reactive and associated resistive elements of the RLC circuit. The method can also comprise providing substantially consistent differential termination for the received differential signals and/or amplifying the outputted, scaled down differential signals to at or around as-transmitted amplitudes of corresponding differential signals. Optionally, the method can further comprise limiting transients in the received differential signals prior to said dynamically compensating; and performing dynamic common-mode offset correction prior to said outputting. Optionally, the received differential signals can be scaled down to the same value within the certain tolerance by one of 50%, 67%, or 75%.

Included among embodiments also is a system for processing differential analog voltage signals comprising: an equalizer configured to receive differential analog voltage signals and having an RLC circuit operative to reduce adaptively an amplitude of the received differential analog voltage signals based on frequencies of the received differential analog voltage signals; and a receiver operatively coupled to the equalizer, wherein the receiver is configured and operative to receive the reduced differential analog voltage signals and to increase the amplitude of the received reduced differential analog voltage signals.

Embodiments of the disclosed subject matter also include a wideband differential equalizer configured and operative as a differential termination to compensate dynamically for cable-induced signal loss from any received differential analog video signal having a frequency in a range from DC to 200 MHz. The wideband differential equalizer comprises: input circuitry to receive at first and second input terminals thereof a first differential analog video signal having a maximum amplitude at a first value; output circuitry to output at first and second output terminals thereof a second differential analog video signal having a maximum amplitude at a second value less than the first value of the first differential analog video signal; and scaling circuitry operatively coupled between said input circuitry and said output circuitry and configured and operative to scale down dynamically the maximum amplitude of the first differential analog video signal from the first value to the second value. The scaling circuitry includes: a first parallel-connected resistor-capacitor pair, a second parallel-connected resistor-capacitor pair, a first series-connected inductor-resistor pair, and a second series-connected inductor-resistor pair; a first end of said first parallel-connected resistor-capacitor pair being connected to the first input terminal of said input circuitry; a first end of said second parallel-connected resistor-capacitor pair being connected to the second input terminal of said input circuitry; a first end of said first series-connected inductor-resistor pair being connected to a second end of said first parallel-connected resistor-capacitor pair; a first end of said second series-connected inductor-resistor pair being connected to a second end of said second parallel-connected resistor-capacitor pair; and second ends of said first series-connected inductor-resistor pair and said second series-connected inductor-resistor pair being connected together. Optionally, the differential equalizer can maintain a same differential impedance, +−10%, throughout the frequency range.

Embodiments also include computer program products or non-transitory computer readable media that can perform some or all aspects or functionality of methods, circuitry, circuits, or systems as set forth herein and according to embodiments of the disclosed subject matter. For instance, embodiments of the disclosed subject matter can include a non-transitory computer readable storage medium having stored thereon software instructions that, when executed by a processor, cause the processor to perform operations comprising: causing dynamic compensation for signal loss in received differential signals as the frequency content of the received differential signals varies, wherein the dynamically compensating includes scaling down the received differential signals to a same value within a certain tolerance; and causing output of the scaled down differential signals. Optionally, the received differential signals can be scaled down to the same value within the certain tolerance by one of 50%, 67%, or 75%.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Any values dimensions illustrated in the accompanying graphs and figures are for illustration purposes only and may not represent actual or preferred values or dimensions. Where applicable, some features may not be illustrated to assist in the description of underlying features.

DESCRIPTION

Figure 1:
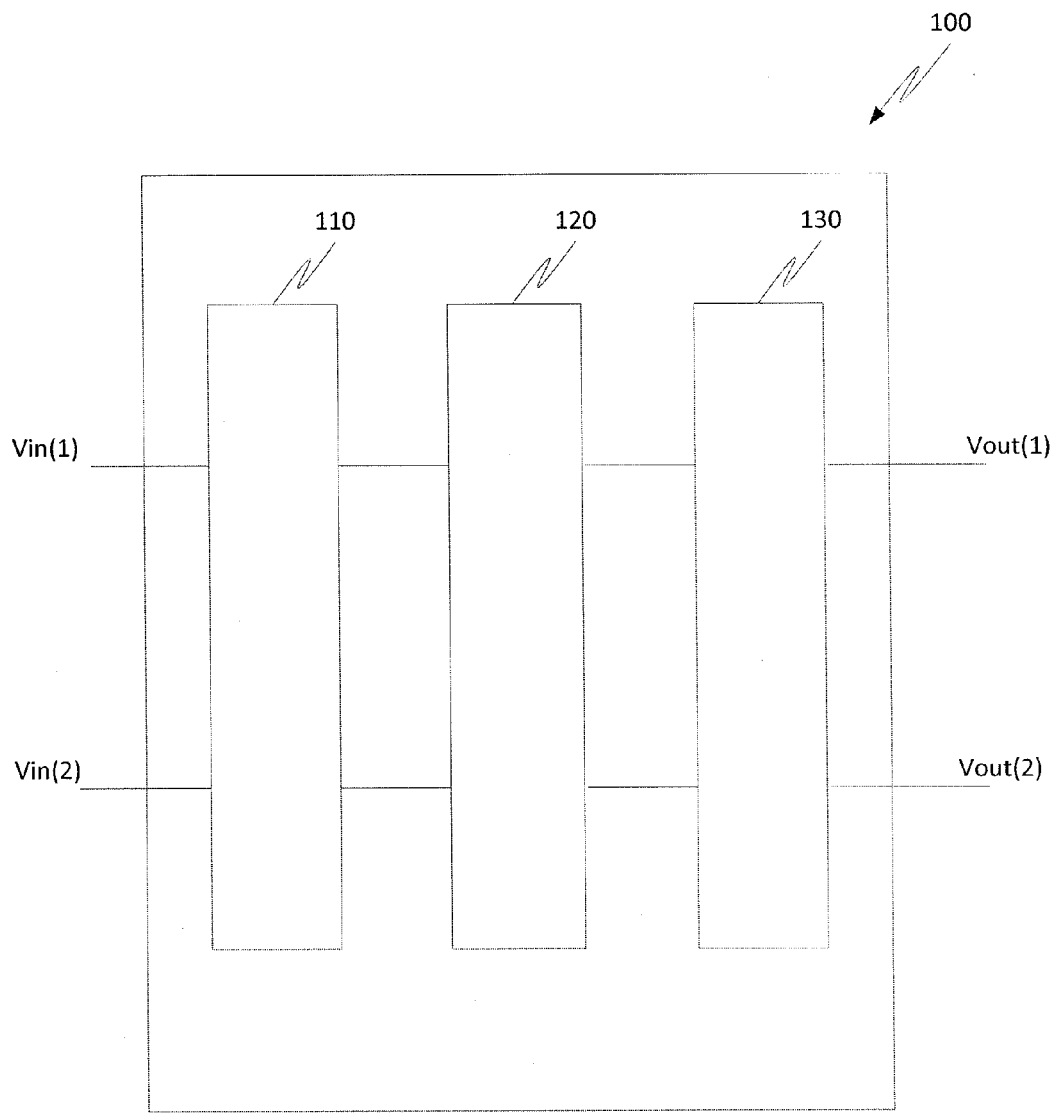
FIG. 1 is a block diagram of a signal modification circuit according to embodiments of the disclosed subject matter.

The description set forth below in connection with the appended drawings is intended as a description of various embodiments of the disclosed subject matter and is not intended to represent the only embodiments in which the disclosed subject matter may be practiced. The description includes specific details for the purpose of providing a thorough understanding of the disclosed subject matter. However, it will be apparent to those skilled in the art that the disclosed subject matter may be practiced without these specific details. In some instances, well-known structures and components may be shown in block diagram form in order to avoid obscuring the concepts of the disclosed subject matter.

Signals, such as analog or digital video signals, can be comprised of content with a wide range of frequencies. Such signals may be attenuated in cabling by varying amounts based upon the frequency content of the signals. For instance, cables, such as coaxial, triaxial, and twisted-pair cables, can exhibit greater loss at higher frequencies than at lower frequencies. Thus, signals transmitted via cabling at higher frequencies and without pre-emphasis, for example, can have lower amplitudes at a receiving end of the cabling due to the innate lossy characteristics of the cabling and/or due to interference. In the case of video signals, such transmission and resultant amplitude loss can cause lower definition in video display output.

Analog and digital signals can be transmitted in single-ended or differential format. In the case of differential signals, these signals often contain a common-mode DC offset (e.g., +/−5V) above or below an ideal ground center reference. The common-mode DC offset, itself, can experience positive and/or negative offset caused by noise or interference that has been "converted" to a differential or common-mode signal on the line. Further, video signals may contain transients on the order of +/−50V, for instance, differential mode and/or common mode. At a receiving end, differential mode and/or common mode transients can cause damage to components, such as a video receiver.

Accordingly, it is desirable for signals (e.g., a differential video signal) transmitted at specific amplitudes at various frequencies to be received at a receiving end of a cable and reliably handled throughout a wide frequency range (e.g., a wideband) for efficient and effective amplification in a receiver to the original, transmitted signals or desired signals, for example. It is further desirable that the received signals have no DC offset from the ideal ground center reference (e.g., common-mode DC offset) or that any such offset is prevented or compensated for at the receiving end by common-mode nulling (i.e., rejection of common-mode voltage). It is also desirable to provide appropriate differential termination and to limit or negate positive and/or negative differential- and common-mode transients or overvoltages. Each embodiment of the disclosed subject matter addresses some or all of these aforementioned issues.

In particular, embodiments of the disclosed subject matter include signal modification circuits in the form of equalizers and systems, methods, and computer program products thereof. In particular, embodiments include differential equalizers and systems, methods, and computer products thereof.

Generally speaking, embodiments of the disclosed subject matter can dynamically compensate for signal losses over a wide frequency range by maintaining a relatively constant or consistent differential potential over the frequency range, provide dynamic common-mode offset correction to received signals before outputting the signals (e.g., to a sensitive video receiver), provide appropriate differential termination, and/or effectively limit both positive and negative transients that may be present in both differential- and common-mode aspects. In embodiments, frequency pre-emphasis applied to a differential signal at the transmitting end of a cable in order to boost the high frequency content may be unnecessary or reduced.

Embodiments can receive an incoming differential signal and scale down the differential signal to a value (e.g., to 50%, 67%, 75%) through an RCL circuit. The RLC circuit can create "headroom" by dynamically adjusting the ratio between reactive and resistive circuit elements as the frequency content of the input signal varies. In the case of cabling in the form of coaxial cable, because the RLC circuit can be interpreted as the opposite configuration of the theoretical distributed RLC configuration within a standard coaxial cable, it can be referred to as an "anti-coax," and, as such, can be effective at nullifying the signal-degrading aspects of the coaxial cable. Thus, in embodiments, the RLC circuit can maintain a relatively same differential impedance, +/−10%, for example, throughout a frequency range of input signals, thereby outputting signals at or around a same value within certain tolerances.

As an example, at frequencies at or below 2 MHz, the RLC circuit according to embodiments of the disclosed subject matter can produce an even 50/50 ratio between reactive and associated resistive elements, thereby producing an output 50% of the input. As frequency increases to 200 MHz and the incoming signal suffers cabling losses by as much as 50%, the RLC circuit can compensate by altering of the reactive values to overcome this loss, thereby producing an output of nearly 100% of the input, or 50% of the original signal, and thus maintaining a consistent 50% output throughout the full frequency range. This output can thereafter be amplified by an amplifier stage to the 100% level (e.g., back to this level) without concern of overdriving such amplifier stage at the lower frequencies, which otherwise naturally can have higher potential differential signals due to reduced signal attenuation on the line.

FIG. 1 is a basic block diagram of a signal modification circuit 100 according to embodiments of the disclosed subject matter. In various embodiments, signal modification circuit 100 can be an equalizer, a differential equalizer, for instance, configured and operative as a termination circuit. Optionally, the equalizer can be a wideband equalizer that can accommodate a frequency range of 2 MHz through 200 MHz, for example.

The signal modification circuit 100 can receive input signals, such as a differential input signal or a single-ended input signal from any suitable source such as a transmitter or transceiver via any suitable means, including a coaxial cable, a triaxial cable, a twisted pair cable, traces on a PCB, etc. In the case of single-ended signals, the signal modification circuit 100 can be halved top-to-bottom about a ground point.

In FIG. 1, signal modification circuit 100 is shown as receiving inputs Vin(1) and Vin(2) in the form of video signals, but inputs other than video signals may be received, including a combination of video signals and audio signals, for instance. Inputs Vin(1) and Vin(2) can be a differential signal, for example, and, as indicated earlier, can include analog or digital signals. In the case of digital signals, differential or otherwise, signal modification circuit 100 may "square-up" the digital edges while applying the necessary equalization. In various embodiments, the signals Vin(1) and Vin(2) can be without any frequency pre-emphasis at the transmitting side or with reduced frequency pre-emphasis at the transmitting side.

Signal modification circuit 100 can output a differential signal Vout(1) and Vout(2), for instance, to any suitable component, such as a receiver or a receiving portion of a transceiver. Signals Vout(1) and Vout(2) can be signals that have been modified as described herein.

Signal modification circuit 100 can be comprised of an input circuit or circuitry 110, a scaling circuit or circuitry 120, and an output circuit or circuitry 130.

Input circuitry 110 is configured and operative to receive input signals as indicated herein from a transmitter or a transceiver, for example, via a coaxial cable, a triaxial cable, a twisted pair cable, traces on a PCB, etc. FIG. 1 shows input circuitry 110 receiving at first and second input terminals differential signals Vin(1) and Vin(2) (collectively a differential signal). Outputs of input circuitry 110 are connected to inputs of scaling circuit 120. As is apparent from the discussion herein, input circuitry 110 can perform suitable functions or operations on the received signals, including merely passing through the signals to scaling circuit 120, or providing smoothing, transient protection, and/or overvoltage protection before passing the signals to scaling circuit 120.

Output circuitry 130 is coupled to outputs of scaling circuit 120 and is configured and operative to output signals received from the scaling circuit 120 via any suitable transmission means. Generally speaking, the output of the output circuitry 130 can have a maximum value (e.g., amplitude) that is less than a maximum value of the input signals to the scaling circuit 120.

Scaling circuit 120 is operatively coupled between input circuitry 110 and output circuitry 130. Scaling circuit 120 can have any suitable configuration, with any suitable components of any suitable values. Scaling circuit 120 can receive signals from input circuitry 110 and reduce or scale down the maximum value of the signal by a predetermined amount. In various embodiments, the incoming signals can be reduced or scaled down based on their frequency content. Thus, all signals can be reduced or scaled down by an amount based on their frequency content such that the output of the scaling circuit 120 is at or about at a same maximum value (e.g., amplitude) for all frequency values of the signals. In various embodiments, the same or about the same maximum value may be within a certain range or tolerance of the predetermined amount.

Such outputting of scaled down signals can be attributed to the scaling circuit's 120 ability to maintain a relatively same differential impedance throughout the frequency range of the input signals.

Figure 2:
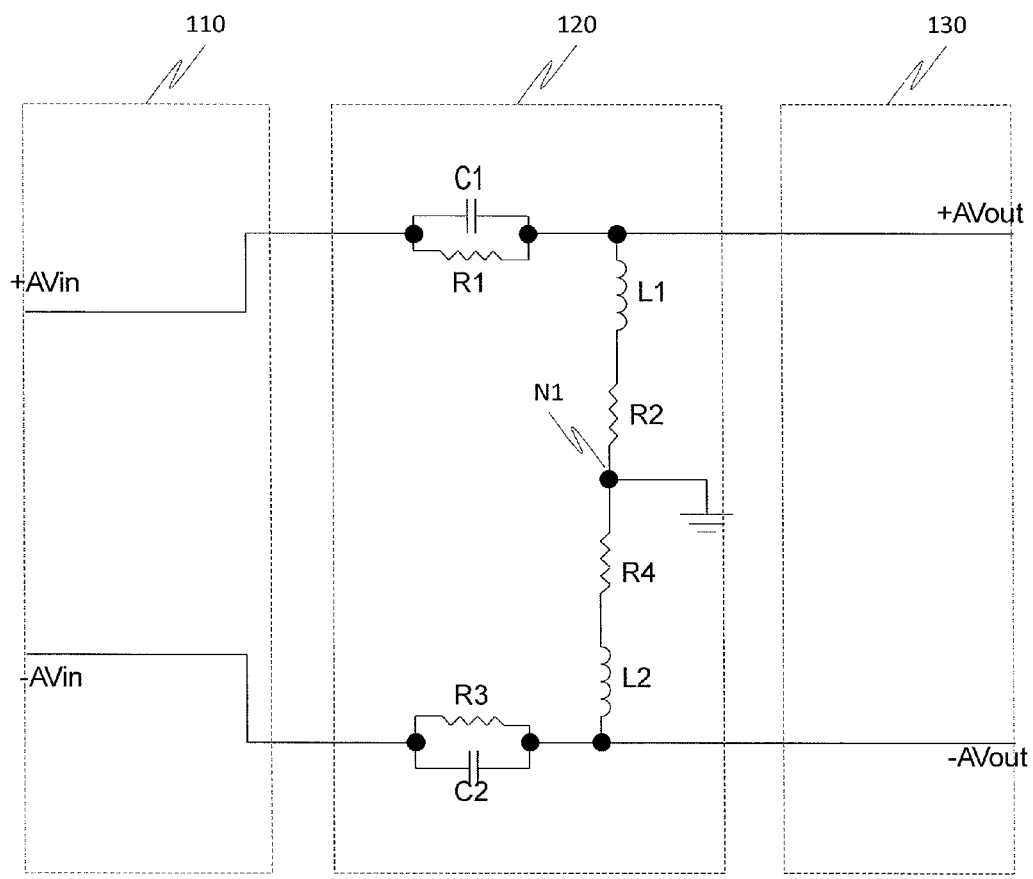
FIG. 2 is a schematic representation of a signal modification circuit according to embodiments of the disclosed subject matter.

FIG. 2 shows a schematic representation of a signal modification circuit according to embodiments of the disclosed subject matter.

As shown in FIG. 2, the signal modification circuit includes input circuitry 110, a scaling circuit 120, and output circuitry 130. As indicated in FIG. 2, input circuitry 110 can receive differential analog video signals +Avin and −Avin. Generally, the signal modification circuit shown in FIG. 2 does not provide transient protection at its input, can provide compensation for received signal loss throughout a frequency range (e.g., DC to 200 MHz or 2 MHz to 200 MHz), can provide differential termination with a certain percentage scaling factor, and does not provide common node nulling. Optionally, the signal modification circuit shown in FIG. 2 can provide differential termination with a 67% scaling factor to match an ADV7441 chip, for instance. Note that the signal modification circuit shown in FIG. 2 can be modified to receive a single-ended signal, whereby the signal modification circuit can be halved top-to-bottom about ground point N1.

The signal modification circuit can be connected as shown and with the circuit components shown in FIG. 2. In particular, input circuitry 110 and output circuitry 130 can each be comprised of wire pairs leading in to and out of, respectively, scaling circuit 120.

Scaling circuit 120 can be configured as shown in FIG. 2, operatively coupled between input circuitry 110 and output circuitry 130. Further, scaling circuit 120 can include the components shown in FIG. 2, including capacitors C1 and C2; resistors R1, R2, R3, and R4; and inductors L1 and L2.

Resistor R1 and capacitor C1 are connected in parallel and constitute a parallel-connected resistor capacitor pair. A first node of this parallel-connected resistor capacitor pair is connected to the input line of the input circuitry 110 associated with input signal +Avin, and a second node of this parallel-connected resistor capacitor pair is connected to the output line of the output circuitry 130 associated with output signal +Avout. This second node is also connected to one end of inductor L1. Similarly, resistor R3 and capacitor C2 are connected in parallel and constitute another parallel-connected resistor capacitor pair. A first node of this parallel-connected resistor capacitor pair is connected to the input line of the input circuitry 110 associated with input signal −Avin, and a second node of this parallel-connected resistor capacitor pair is connected to the output line of the output circuitry 130 associated with output signal −Avout. This second node is also connected to one end of inductor L2.

Resistor R2 and inductor L1 are connected in series and constitute a series-connected inductor-resistor pair. Resistor R4 and inductor L2 are also connected in series and also constitute another series-connected inductor-resistor pair. Ends of resistors R2 and R4 are commonly connected at a center node N1 to ground. Alternatively, in various embodiments, the places of L1 and R2 and L2 and R4 may be switched so that ends of inductors L1 and L2 are commonly connected at the center node N1 to ground. As yet another variation, the places of only one of L1 and R2 or L2 and R4 may be switched, thereby providing a resistor and inductor connected directly to ground via node N1.

As indicated earlier, the values for the components of the scaling circuit 120 can be any suitable values. For instance, R1 and R3 may be of the same value or different values, C1 and C2 may be of the same value or different values, R2 and R4 may be of the same value or different values, and/or L1 and L2 may be of the same value or different values. Tables 1 and 2 below show examples of values for each of the aforementioned components and resultant operating characteristics of the scaling circuit 120. Accordingly, scaling circuits 120 according to embodiments of the disclosed subject matter can be configured and operative according to one of Table 1 and Table 2 and interpolations and extrapolations thereof. Of course the values shown in Tables 1 and 2 are merely examples and are by no means meant to limit values or frequencies capable of being received and modified and actually received and modified.

TABLE 1

| Frequency (MHz) | R1&R3 (Ohms) | C1&C2 (pF) | R2&R4 (Ohms) | L1&L2 (nH) | Vin (with input loss) Vp-p | Vout (with input loss) Vp-p | Circuit Gain (dB) | Z(in) (Ohms) | Z(inDiff) (Ohms) |
|---|---|---|---|---|---|---|---|---|---|
| 2 | 15 | 270 | 26.7 | 10 | 1.00 | 0.65 | −3.71 | 41.10 | 82.20 |
| 10 | 15 | 270 | 26.7 | 10 | 0.95 | 0.66 | −3.15 | 39.29 | 78.57 |
| 25 | 15 | 270 | 26.7 | 10 | 0.90 | 0.68 | −2.44 | 37.44 | 74.88 |
| 50 | 15 | 270 | 26.7 | 10 | 0.85 | 0.70 | −1.74 | 36.44 | 72.89 |
| 75 | 15 | 270 | 26.7 | 10 | 0.80 | 0.69 | −1.32 | 36.57 | 73.14 |

TABLE 1-continued

| Frequency (MHz) | R1&R3 (Ohms) | C1&C2 (pF) | R2&R4 (Ohms) | L1&L2 (nH) | Vin (with input loss) Vp-p | Vout (with input loss) Vp-p | Circuit Gain (dB) | Z(in) (Ohms) | Z(inDiff) (Ohms) |
|---|---|---|---|---|---|---|---|---|---|
| 100 | 15 | 270 | 26.7 | 10 | 0.75 | 0.66 | −1.05 | 37.21 | 74.43 |
| 150 | 15 | 270 | 26.7 | 10 | 0.70 | 0.64 | −0.72 | 39.24 | 78.48 |
| 200 | 15 | 270 | 26.7 | 10 | 0.65 | 0.61 | −0.53 | 41.73 | 83.46 |

TABLE 2

| Frequency (MHz) | R1&R3 (Ohms) | C1&C2 (pF) | R2&R4 (Ohms) | L1&L2 (nH) | Vin (with input loss) Vp-p | Vout (with input loss) Vp-p | Z(in) (Ohms) | Z(inDiff) (Ohms) |
|---|---|---|---|---|---|---|---|---|
| 2 | 649 | 6.8 | 1000 | 470 | 1.00 | 0.62 | 1620.81 | 3241.61 |
| 10 | 649 | 6.8 | 1000 | 470 | 0.95 | 0.64 | 1537.64 | 3075.28 |
| 25 | 649 | 6.8 | 1000 | 470 | 0.90 | 0.66 | 1457.12 | 2914.24 |
| 50 | 649 | 6.8 | 1000 | 470 | 0.85 | 0.69 | 1419.61 | 2839.21 |
| 75 | 649 | 6.8 | 1000 | 470 | 0.80 | 0.68 | 1432.22 | 2864.44 |
| 100 | 649 | 6.8 | 1000 | 470 | 0.75 | 0.66 | 1467.33 | 2934.65 |
| 150 | 649 | 6.8 | 1000 | 470 | 0.70 | 0.64 | 1568.76 | 3137.51 |
| 200 | 649 | 6.8 | 1000 | 470 | 0.65 | 0.61 | 1689.77 | 3379.53 |

Vin in Tables 1 and 2 shows an example of received input signal levels at corresponding frequencies, and Vout indicates a relatively constant output level across the given frequency range. Thus, scaling circuitry 120 can scale down dynamically the maximum value (e.g., amplitude) of an input signal at a given frequency from a first value to a second value. The overall gain of scaling circuit 120 (explicitly shown in Table 1 but not in Table 2) across the given frequency range thus produces output levels relatively unaffected by frequency content of the input signals. Tables 1 and 2 also show that differential impedance Z(inDiff) is maintained relatively constant throughout the frequency range. For instance, Table 1 shows a standard 75 Ohm (e.g., +/−10%) differential impedance being maintained throughout the frequency range. In various embodiments, the output Vout can be amplified at a later stage (i.e., once output from output circuitry 130) back to 1 Vp-p, for instance.

Figure 3:
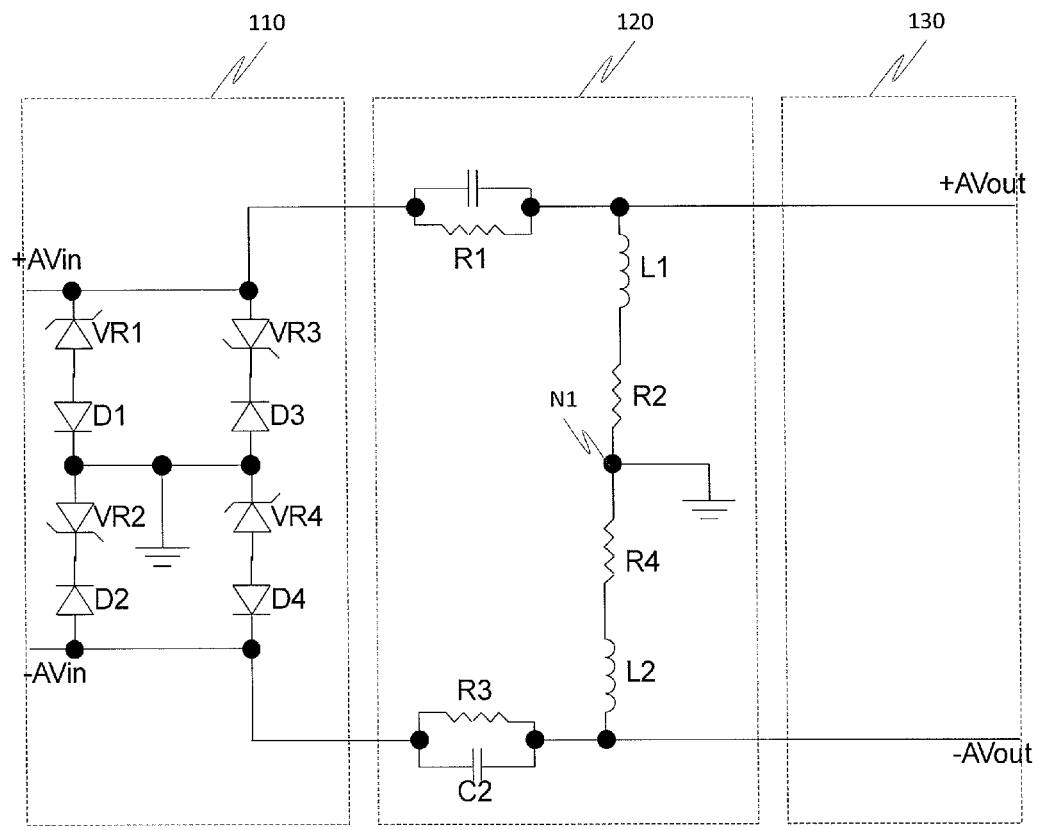
FIG. 3 is a schematic representation of a signal modification circuit similar to the circuit shown in FIG. 2, but additionally with transient protection circuitry.

FIG. 3 is a schematic representation of a signal modification circuit that is operative and configured the same as the circuit shown in FIG. 2, but additionally with transient protection circuitry as part of the input circuitry 110.

In general, the signal modification circuit shown in FIG. 3 can provide transient protection at its input, can provide compensation for received signal loss throughout a frequency range (e.g., DC to 200 MHz or 2 MHz to 200 MHz), can provide differential termination with a certain percentage scaling factor, and does not provide common node nulling. Optionally, the signal modification circuit shown in FIG. 3 can provide differential termination with a 67% scaling factor to match an ADV7441 chip, for instance. As with FIG. 2 above, the signal modification circuit shown in FIG. 3 can be modified to receive a single-ended signal, whereby the signal modification circuit can be halved top-to-bottom about a ground point N1.

Input circuitry 110 includes transient protection circuitry that can limit both positive and negative differential mode and common mode transients, for example, for any values beyond +/−6.9V. The transient protection circuitry portion of the input circuitry 110 can be connected between positive and negative differential inputs and can include a plurality of diode-Zener diode pairs, including D1-VR1, D2-VR2, D3-VR3, and D4-VR4. Second ends of all of the diode-Zener diode pairs may be commonly connected to ground, for instance. Optionally, the transient protection circuitry may be arranged as close as possible to the input terminals of the signal modification circuit to reduce or eliminate any transients as soon as they reach the signal modification circuit. Further, line distance between the input circuitry 110 (with or without transient protection circuitry) to the scaling circuit 120 may be extended or a relatively long distance so as to deter transients from reaching the scaling circuit and being output via the output circuitry 130.

Embodiments of the disclosed subject matter are not limited to the transient protection circuitry explicitly shown in FIG. 3, and any suitable transient suppression circuitry or circuitry configuration and components can be implemented, including clamping circuitry or devices, crowbar circuitry or devices, varistors, gas discharge tubes, metal-oxide varistors (MOVs), shunting devices (single or multi-stage devices), transient voltage suppression (TVS) circuitry, such as TVS diodes, etc.

Figure 4:
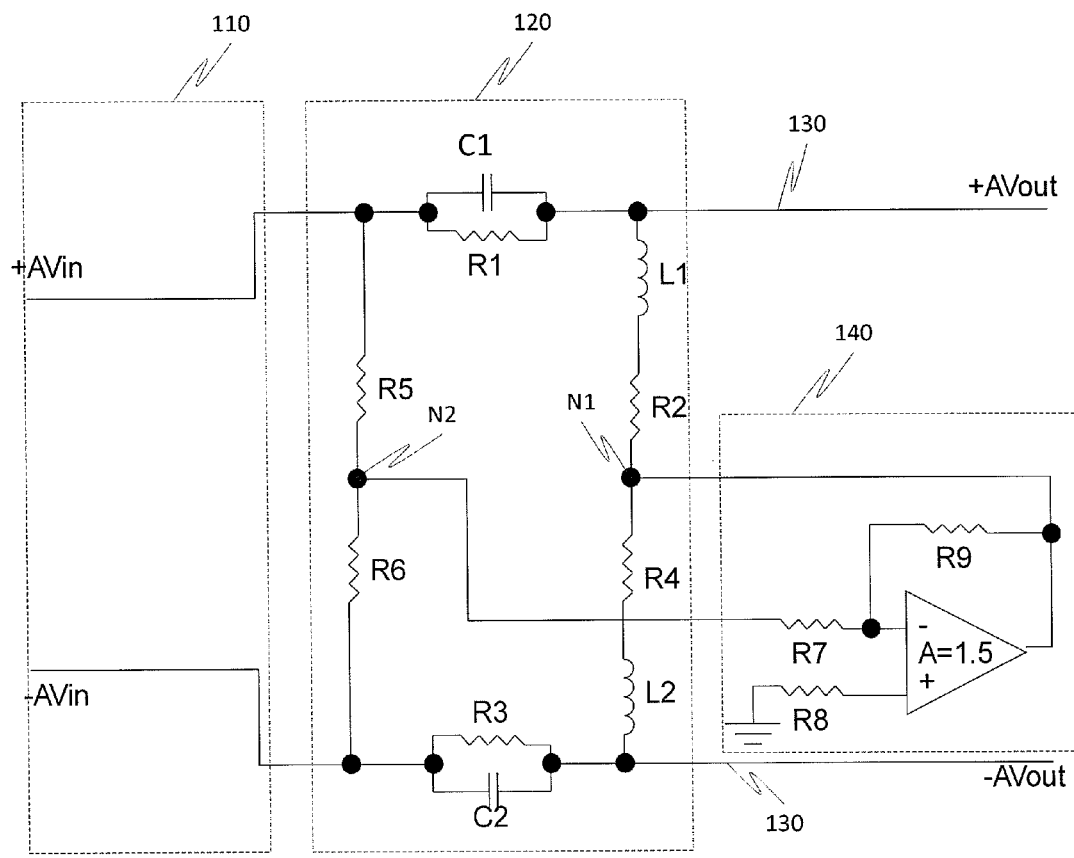
FIG. 4 is a schematic representation of a signal modification circuit similar to the circuit shown in FIG. 2, but additionally with common-mode nulling circuitry.

FIG. 4 is a schematic representation of a signal modification circuit that is similar to the signal modification circuit shown in FIG. 2, but additionally with common-mode nulling circuitry 140.

Generally speaking, the signal modification circuit shown in FIG. 4 does not provide transient protection, can provide compensation for received signal loss throughout a frequency range (e.g., DC to 200 MHz or 2 MHz to 200 MHz), can provide differential termination with a certain percentage scaling factor, and can provide full common-mode nulling through the signal modification circuit's entire operating requirement (e.g., +/−5V). Optionally, the signal modification circuit shown in FIG. 4 can provide differential termination with a 67% scaling factor to match an ADV7441 chip, for instance. Note that the signal modification circuit shown in FIG. 4 can be modified to receive a single-ended signal, whereby the signal modification circuit can be halved top-to-bottom about ground.

Common-mode nulling circuitry 140 can have components as indicated in FIG. 4 and can be coupled as shown in FIG. 4. Specifically, nulling circuitry 140 can be configured and operative to perform common-mode nulling and can be comprised of a voltage divider having a first resistor R5 and a second resistor R6 and an operational amplifier with negative feedback and associated resistors R7, R8, and R9. As can be seen from FIG. 4, the voltage divider of resistors R5 and R6 is connected between input ends of the resistor-capacitor pairs R1-C1 and R3-C2. A center node N2 of the voltage divider is connected to one input terminal of the operational amplifier via resistor R7, for instance, and the other input terminal of the operational amplifier is connected to ground via resistor R8. The output of the operational amplifier can be fed back (e.g., negative feedback) via resistor R9 to the input terminal of the operational amplifier connected to center node N2 (via resistor R7). The output of the operational amplifier is also connected to node N1 of the scaling circuit 120.

Consistent differential termination throughout a frequency range of input signals may be provided by resistors R5 and R6, especially when these resistors are relatively high values (e.g., 10 k Ohms), as high Ohmic values for resistors R5 and R6 can insulate the termination attributes of the RLC circuit of the scaling circuit 120. Further, the voltage divider comprised of R5 and R6 can determine the common mode voltage, which can be inverted and amplified by the Op Amp whose output is connected to center node N1 in order to provide a counter-potential, thus nullifying the effects of any common-mode voltage present at the input lines +AVin and −AVin. Optionally, a relatively high current (i.e., large) Op Amp may be required to keep the center node N1 at a solid "virtual ground."

In an alternate implementation that can require relatively less current at the Op Amp, the values of resistors R5 and R6 in the voltage divider to establish the common-mode voltage may have resistor values that are slightly above ½ of the intended termination impedance (typically very low values, e.g., 37.5 Ohms, 38.4 Ohms, or 50 Ohms each to produce differential termination of 75 Ohms or 100 Ohms). The RLC values, in turn, can be selected to provide a high impedance value relative to this termination value, thus maintaining the requisite differential impedance and allowing common-mode offset compensation and drawing relatively less current.

Figure 5:
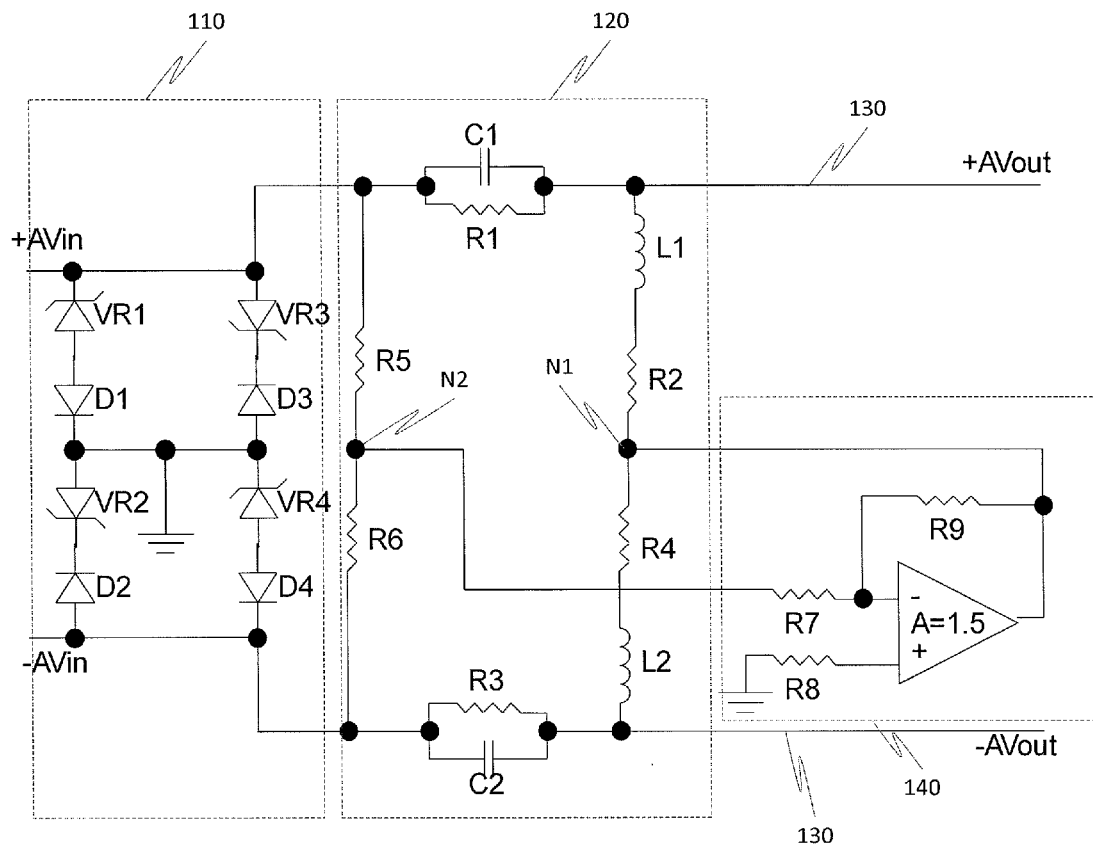
FIG. 5 is a schematic representation of a signal modification circuit similar to the circuit shown in FIG. 2, but additionally with common-mode nulling circuitry and transient protection circuitry.

FIG. 5 is a schematic representation of a signal modification circuit that is similar to the signal modification circuit shown in FIG. 4, but additionally with transient protection circuitry as part of the input circuitry 110. In general, the signal modification circuit of FIG. 5 can provide transient protection (e.g., complete differential and common-mode transient protection +/−6.9V), can provide compensation for received signal loss throughout a frequency range (e.g., DC to 200 MHz or 2 MHz to 200 MHz), can provide differential termination with a certain percentage scaling factor, and can provide full common-mode nulling through entire the signal modification circuit's entire operating requirement (e.g., +/−5V). Optionally, the signal modification circuit shown in FIG. 5 can provide differential termination with a 67% scaling factor to match an ADV7441 chip, for example. Like the signal modification circuit shown in FIG. 2, the signal modification circuit shown in FIG. 5 can be modified to receive a single-ended signal, whereby the signal modification circuit can be halved top-to-bottom about ground.

Figure 6:
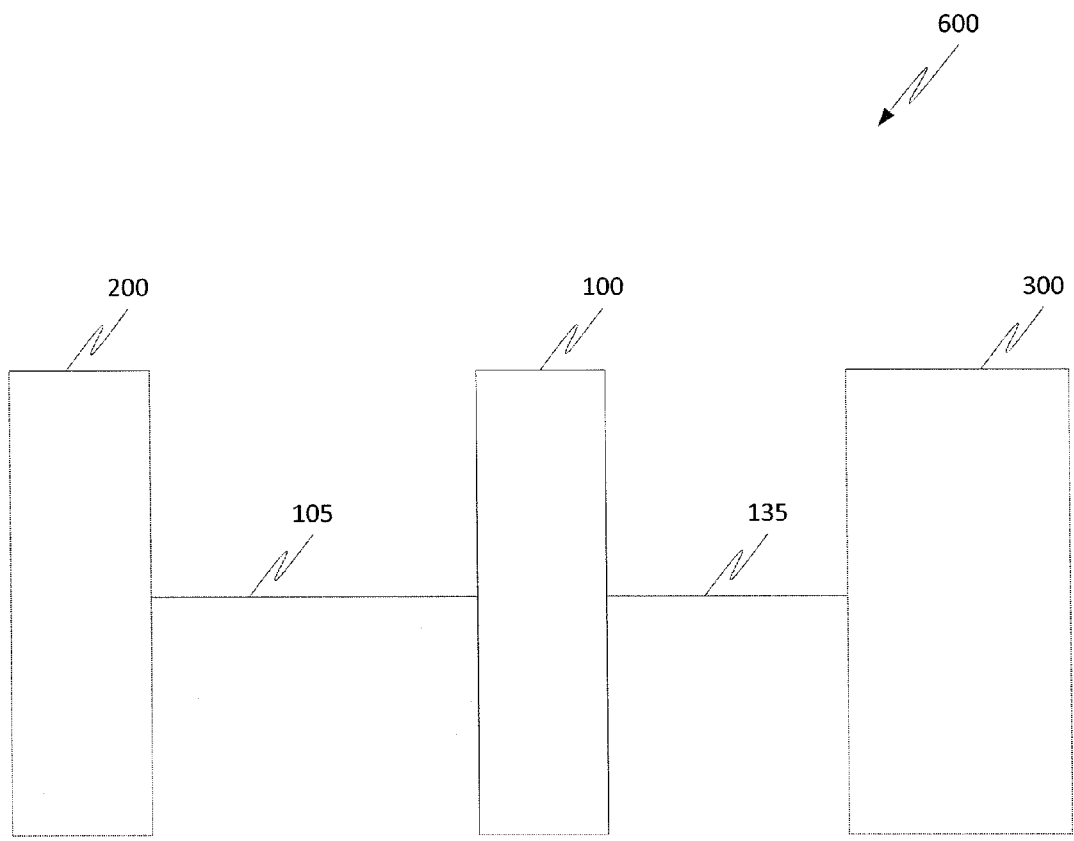
FIG. 6 is block diagram of a system according to embodiments of the disclosed subject matter.

FIG. 6 is block diagram of a system 600 according to embodiments of the disclosed subject matter.

System 600 can include a transmitter or transceiver 200, a signal modification circuit 100 according to embodiments of the disclosed subject matter, and a receiver or transceiver 300. System 600 can process signals as described herein, in that signals can be transmitted from transmitter 200 via a communication medium, such as cabling or wiring to signal modification circuit 100, which can modify the signals as described herein and thereafter send the modified signals to receiver 300. In various embodiments, signals transmitted by transmitter 200 can be without any frequency pre-emphasis or with a reduced amount of frequency pre-emphasis. Further, in various embodiments, receiver 300 can include an amplification stage that can amplify or increase the magnitude of the signal received from signal modification circuit 100. After amplification, the signals may be output, for instance, on a video display in any of a helicopter, a truck, a trailer, and an airplane, for example.

Figure 7:
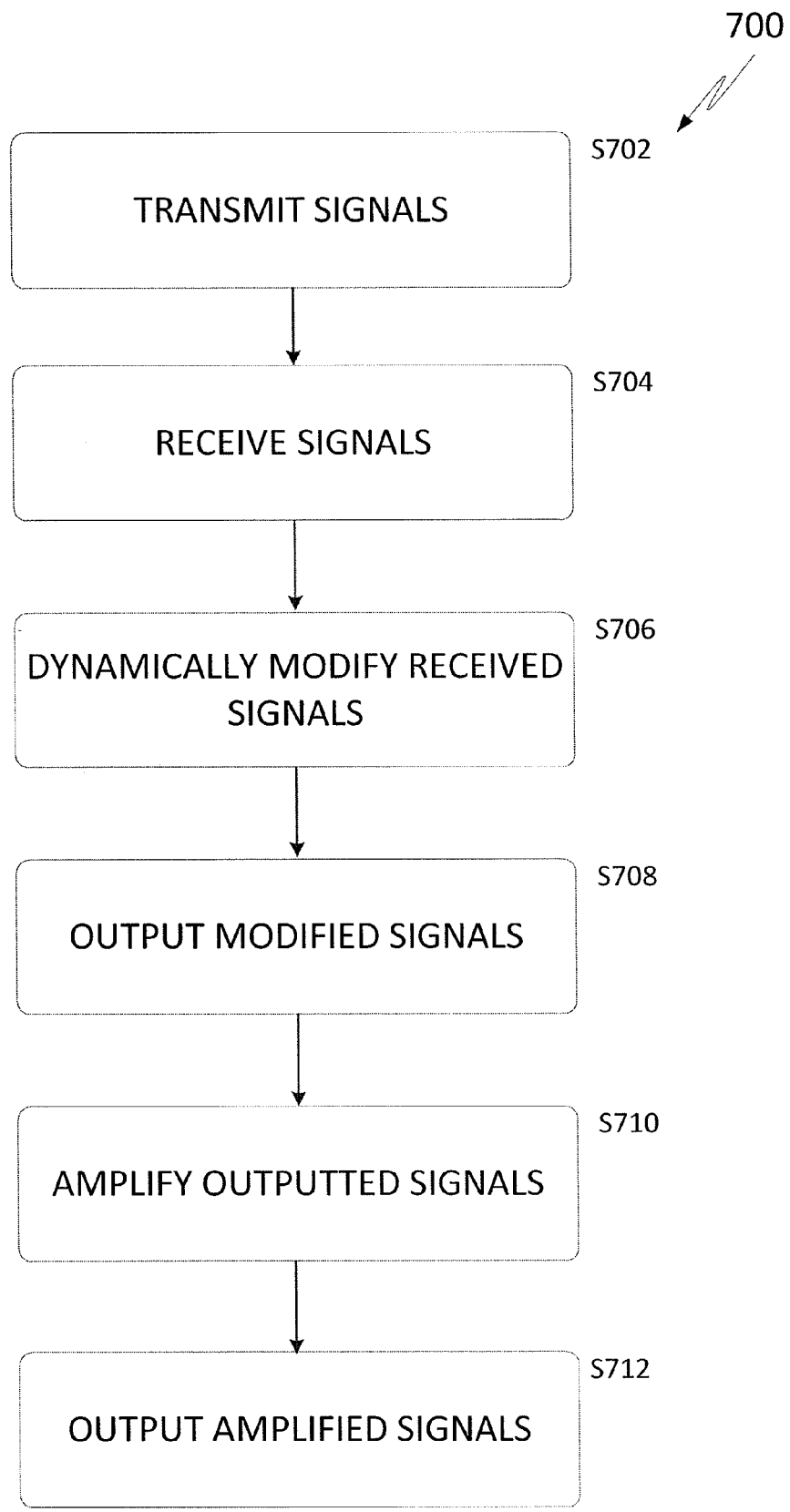
FIG. 7 is a flow chart for a method according to embodiments of the disclosed subject matter.

FIG. 7 is a flow chart for a method 700 according to embodiments of the disclosed subject matter.

Method 700 can include receiving signals as described herein, such as differential analog video signals S704. Optionally, method 700 can perform or otherwise provide smoothing or overvoltage and/or transient protection upon receiving the signals. Optionally, the method can include transmitting the signals without frequency pre-emphasis or with reduced frequency pre-emphasis S702.

The received signals can be modified dynamically, for instance, by compensating for signal loss in the received signals as the frequency content of the received signals varies S706. The dynamic modification can include scaling down the received signals to a same value within a certain tolerance throughout an entire range of frequencies for the input signals. Such scaling can be achieved by maintaining a relatively constant differential impedance throughout the entire range of frequencies for the input signals based on dynamic adjustment of elements of an RLC circuit, whereby a ratio between reactive and associated resistive elements of the RLC circuit is modified. In various embodiments, the dynamic modification of the signals can be according to Tables 1 and 2 as indicated above.

The dynamically modified signals can be output, for instance, to a receiver S708, whereupon they can be amplified to a suitable level, such as the original transmitted level S710, and outputted S712. Optionally, common-mode offset correction or nulling can be performed prior to outputting of the dynamically modified signals. The amplified, dynamically modified signals can be output to any suitable electronic component, such as a video display in the case of video signals.

It will be appreciated that portions (i.e., some or all) of the circuits, circuitry, modules, processes, sections, and systems described herein can be implemented in hardware, hardware programmed by software, software instructions stored on a non-transitory computer readable medium, or a combination of the above.

The instructions can be compiled from source code instructions provided in accordance with a programming language such as Java, C++, or the like. The instructions can also comprise code and data objects provided in accordance with a structured or object-oriented programming language, for instance. The sequence of programmed instructions and data associated therewith can be stored in a non-transitory computer-readable medium such as a computer memory or storage device which may be any suitable memory apparatus, such as ROM, PROM, EEPROM, RAM, flash memory, disk drive, and the like.

Furthermore, the circuits, circuitry, modules, processes, systems, and sections can be implemented as a single processor or as a distributed processor. Further, it should be appreciated that the steps mentioned above may be performed on a single or distributed processor (single and/or multi-core). Also, the circuits, circuitry, processes, modules, and sub-modules described in the various figures of and for embodiments above may be distributed across multiple computers or systems or may be co-located in a single processor or system. Exemplary structural embodiment alternatives suitable for implementing the circuits, circuitry, modules, sections, systems, means, or processes described herein are provided below.

The circuits, circuitry, modules, processors or systems described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents modules, circuits, or circuitry), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the user interface and/or computer programming arts.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A wideband differential equalizer configured and operative as a differential termination to compensate dynamically for cable-induced signal loss from any received differential analog video signal having a frequency in a range from DC to 200 MHz, said wideband differential equalizer comprising:
   input circuitry to receive at first and second input terminals thereof a first differential analog video signal having a maximum amplitude at a first value;
   output circuitry to output at first and second output terminals thereof a second differential analog video signal having a maximum amplitude at a second value less than the first value of the first differential analog video signal; and
   scaling circuitry operatively coupled between said input circuitry and said output circuitry and configured and operative to scale down dynamically the maximum amplitude of the first differential analog video signal from the first value to the second value, said scaling circuitry including:
   a first parallel-connected resistor-capacitor pair, a second parallel-connected resistor-capacitor pair, a first series-connected inductor-resistor pair, and a second series-connected inductor-resistor pair;
   a first end of said first parallel-connected resistor-capacitor pair being connected to the first input terminal of said input circuitry;
   a first end of said second parallel-connected resistor-capacitor pair being connected to the second input terminal of said input circuitry;
   a first end of said first series-connected inductor-resistor pair being connected to a second end of said first parallel-connected resistor-capacitor pair;
   a first end of said second series-connected inductor-resistor pair being connected to a second end of said second parallel-connected resistor-capacitor pair; and
   second ends of said first series-connected inductor-resistor pair and said second series-connected inductor-resistor pair being connected together,
   wherein said differential equalizer maintains a same differential impedance by +~10% throughout the frequency range.

2. The wideband differential equalizer according to claim 1, wherein said input circuitry is comprised of:
   a first wire connected to the first end of said first parallel-connected resistor-capacitor pair and terminating at said first input terminal, and
   a second wire connected to the first end of said second parallel-connected resistor-capacitor pair and terminating at said second input terminal.

3. The wideband equalizer according to claim 1, wherein the analog video signal received by said input circuitry is from one of a coaxial cable, a triaxial cable, and a twisted pair cable.

4. The wideband differential equalizer according to claim 1, wherein the received first differential analog video signal is without pre-emphasis.

5. The wideband differential equalizer according to claim 1, wherein the same differential impedance is 75 Ohm differential impedance and said differential equalizer maintains 75 Ohm differential impedance by +~10% throughout the frequency range.

6. The wideband differential equalizer according to claim 1, wherein said differential equalizer is configured and operative according to one of Table 1 and Table 2 and interpolations and extrapolations thereof.

7. The wideband differential equalizer according to claim 1, wherein a second end of said first series-connected inductor-resistor pair and a second end of said second series-connected inductor-resistor pair are connected to ground.

8. The wideband differential equalizer according to claim 1, further comprising nulling circuitry operative to provide full common-mode nulling.

9. The wideband differential equalizer according to claim 1, wherein said input circuitry is transient protection circuitry that limits both positive and negative differential mode and common mode transients.

10. The wideband differential equalizer according to claim 9, wherein said input circuitry as transient protection circuitry is comprised of a plurality of diodes and zener diodes.

11. A system for processing differential analog voltage signals comprising:
   an equalizer configured to receive differential analog voltage signals and having an RLC circuit operative to reduce adaptively an amplitude of the received differential analog voltage signals based on frequencies of the received differential analog voltage signals;
   a receiver operatively coupled to said equalizer, said receiver being configured and operative to receive the reduced differential analog voltage signals and to increase the amplitude of the received reduced differential analog voltage signals;
   a first parallel-connected resistor-capacitor pair, a second parallel-connected resistor-capacitor pair, a first series-connected inductor-resistor pair, and a second series-connected inductor-resistor pair; and
   a nulling circuit to perform common-mode nulling, said nulling circuit being comprised of a voltage divider having a first resistor and a second resistor and an operational amplifier with negative feedback,
   wherein:
   a first end of said first parallel-connected resistor-capacitor pair is connected to the first input terminal of said input circuitry,
   a first end of said second parallel-connected resistor-capacitor pair is connected to the second input terminal of said input circuitry,
   a first end of said first series-connected inductor-resistor pair is connected to a second end of said first parallel-connected resistor-capacitor pair,
   a first end of said second series-connected inductor-resistor pair is connected to a second end of said second parallel-connected resistor-capacitor pair,
   second ends of said first series-connected inductor-resistor pair and said second series-connected inductor-resistor pair are connected together at a center node,
   the voltage divider is connected between the first ends of said first and second parallel-connected resistor capacitor pairs, a center node of said voltage divider is connected to an input terminal of said operational amplifier, and
   an output of said operational amplifier is connected to the center node associated with said first and second series-connected inductor-resistor pairs.

12. The system according to claim 11,
   wherein the resistors in said first and second parallel-connected resistor-capacitor pairs are of a same value or substantially a same value,
   wherein the capacitors in said first and second parallel-connected resistor-capacitor pairs are of a same value or substantially a same value,
   wherein the resistors in said first and second series-connected inductor-resistor pairs are of a same value or substantially a same value, and
   wherein the inductors in said first and second series-connected inductor-resistor pairs are of a same value or substantially a same value.

13. The system according to claim 11, further comprising a transmitter to transmit differential analog voltage signals with transmitted amplitudes to said equalizer, the differential analog voltage signals being transmitted via a cable to said equalizer, wherein said receiver increases the amplitudes of the received reduced differential analog voltage signals to the corresponding transmitted amplitudes.

14. The system according to claim 11, wherein the differential analog voltage signal is a differential analog video signal, and said system is for displaying video on a video display unit in one of a helicopter, a truck, a trailer, and an airplane based on the differential video signal.

15. A method for compensating for signal loss in differential signals, comprising:
   receiving differential signals;
   dynamically compensating for signal loss in the received differential signals as the frequency content of the received differential signals varies, said dynamically compensating including scaling down the received differential signals to a same value within a certain tolerance;
   outputting the scaled down differential signals;
   limiting transients in the received differential signals prior to said dynamically compensating; and
   performing dynamic common-mode offset correction prior to said outputting.

16. The method according to claim 15, wherein said dynamically compensating includes dynamic adjustment of elements of an RLC circuit, said dynamic adjustment including adjustment of a ratio between reactive and associated resistive elements of the RLC circuit.

17. The method according to claim 15, further comprising providing substantially consistent differential termination for the received differential signals.

18. The method according to claim 15, further comprising amplifying the outputted, scaled down differential signals to at or around as-transmitted amplitudes of corresponding differential signals.

19. The method according to claim 15, wherein the received differential signals are scaled down to the same value within the certain tolerance to one of 50%, 67%, or 75%.

* * * * *